United States Patent
Reetz et al.

(10) Patent No.: US 6,334,620 B1
(45) Date of Patent: Jan. 1, 2002

(54) BELLOWS SEAL FOR PIVOT JOINTS, ESPECIALLY IN AUTOMOBILES

(75) Inventors: Reinhard Reetz, Ebersbach; Helmut Reichelt, Denkendorf; Josef Reutter, Wernau; Herbert Schwarz, Waiblingen; Walter Ulke, deceased, late of Neuhausen; by Wolfgang Mödinger, legal representative, Stuttgart; Bernd Hermans, Goch; Ulrich Mette, Essen; Karl-Rainer Raukamp, Niederkruechten, all of (DE)

(73) Assignee: TRW Fahrwerksysteme GmbH & Co. KG, Dusseldorf (DE)

( * ) Notice: Subject to any disclaimer, the term of this patent is extended or adjusted under 35 U.S.C. 154(b) by 0 days.

(21) Appl. No.: 09/582,100

(22) PCT Filed: Dec. 12, 1998

(86) PCT No.: PCT/DE98/03684

§ 371 Date: Jun. 9, 2001

§ 102(e) Date: Jun. 9, 2001

(87) PCT Pub. No.: WO99/34122

PCT Pub. Date: Jul. 8, 1999

(30) Foreign Application Priority Data

Dec. 23, 1997 (DE) .......................................... 197 57 434

(51) Int. Cl.⁷ .............................. F16J 15/52; F16D 3/84
(52) U.S. Cl. ...................... 277/635; 277/560; 464/175; 403/50; 403/51
(58) Field of Search ................................. 277/634, 635, 277/636, 644, 650, 560; 403/50, 51; 464/173, 175

(56) References Cited

U.S. PATENT DOCUMENTS

| 3,378,286 | A |   | 4/1968  | Gottschald |
|-----------|---|---|---------|------------|
| 4,121,844 | A | * | 10/1978 | Nemoto et al. ............. 277/635 |
| 4,241,928 | A | * | 12/1980 | Nemoto et al. ............. 277/635 |
| 4,755,078 | A | * | 7/1988  | Blumberg et al. .......... 403/134 |
| 4,832,161 | A | * | 5/1989  | Weiler et al. ............. 188/73.44 |
| 4,856,795 | A | * | 8/1989  | DeLano et al. ............. 277/635 |
| 5,066,159 | A |   | 11/1991 | Urbach |
| 5,876,149 | A | * | 3/1999  | Dorr et al. .................. 403/134 |
| 6,182,975 | B1| * | 2/2001  | Matsushima et al. ....... 277/559 |
| 6,203,024 | B1| * | 3/2001  | Liebich et al. ............. 277/634 |

FOREIGN PATENT DOCUMENTS

| DE | 18 75 318 | 4/1965 |
| DE | 44 13 664 | 12/1994 |

* cited by examiner

*Primary Examiner*—Anthony Knight
*Assistant Examiner*—Vishal Patel
(74) *Attorney, Agent, or Firm*—Crowell & Moring LLP

(57) ABSTRACT

The invention relates to a bellows seal for pivot joints, wherein a first end of the bellows is tightly and rigidly connected to the joint housing. The second end of the bellow tightly and annularly surrounds a tappet and has a radial and sealing surface. Said surface is a front face divided into an inner concave ring surface and an outer concave ring surface. In relation to the axis of the bellow, the angle of inclination of the ring surfaces is approximately $\alpha=70°$ for the external ring surface and approximately $\beta=80°$ for the inner ring surface. The radial extension of the outer ring surface is approximately 12% in relation to the radius of the outer ring surface of the ring flange of the second end of the bellow.

4 Claims, 1 Drawing Sheet

BELLOWS SEAL FOR PIVOT JOINTS, ESPECIALLY IN AUTOMOBILES

BACKGROUND AND SUMMARY OF THE INVENTION

The invention relates to a pivot joint with a bellows seal, in particular for use on automobiles. At a second bellows end of this bellows seal, the sealing of the bellows interior relative to the atmosphere is reinforced, in addition to radial sealing of the annular flange of the bellows relative to the pivot, by means of nonpositive and positive axial bearing contact against a part which is fixedly connected to the pivot outside the bellows.

In a pivot joint of this type, known per se from practice and from German Patent document DE 44 13 664 A1, the invention is concerned with the problem of improving the sealing effect at the second bellows end of the bellows seal.

The problem according to the invention is solved by a pivot joint for automobiles having a bellows surrounding the joint to form a bellows seal. The pivot joint includes a pivot housing, a first end of the bellows connected fixedly and leaktightly to the pivot housing, a pivot, and a second end of the bellows annularly surrounding the pivot leaktightly, wherein relative movements are possible between the second bellows end and the pivot. In the second bellows end, having a sealing effect, a radially outer annular contraction forms an annular flange terminating freely on an end face. A ring assists a radial sealing of the second bellows end and lies in the contraction. The second bellows end bears radially against the pivot via an approximately cylindrical sealing face which is provided with annular axially alternating elevations and depressions having a labyrinth-like effect. The elevations of the approximately cylindrical sealing face of the second bellows end in each case terminate axially in a last elevation which is designed as an annular collar with a cylindrical inner face. Defined by the features which are present in the bellows seal in an uninstalled state: (1) the end face of the annular flange is divided into an inner and an outer concave annular face, of which the outer annular face is designed with greater concavity than the inner annular face; (2) the angles of inclination of the annular faces relative to a bellows axis are approximately $\alpha=70°$ for the outer annular face and approximately $\beta=80°$ for the inner annular face; (3) the radial extent of the outer annular face is approximately 12% in relation to the radius of the outer annular face of the annular flange of the second bellows end; (4) an annular depression is located between the annular collar, adjacent to the inner annular face, on the inner sealing surface of the second bellows end and this inner annular face; (5) flanks of the annular flange of the second bellows end run approximately parallel to one another; (6) the height of the annular flange in the region of the outer annular face measures uniformly approximately 8% of the outer diameter of the annular flange; (7) the ring is designed to be closed and made of inelastic material and projects radially outward into an annular region which is formed by the outer sealing face and in which said ring bears axially against the annular flange; and (8) the axial height of the contraction is smaller than the amount by which the ring would bear positively in this contraction, without the latter being widened, so that, with the ring inserted, this contraction is widened as a result of the elastic deformation of the material of the bellows forming this contraction.

By virtue of the measures according to the invention, both radial sealing and axial sealing at the second bellows end are improved considerably. Expedient refinements of the invention are described herein.

The leaktightness attainable according to the invention is not achieved in bellows seals of a similar generic type, such as, for example, according to German Patent document DE-U 18 75 318 and U.S. Pat. No. 3,378,286 or in the bellows seal according to German Patent document DE 44 13 664 A1. This is attributable to the fact that, in these known seals, the configuration and design of the sealing regions performing the actual sealing function are not optimally coordinated with one another.

BRIEF DESCRIPTION OF THE DRAWINGS

An exemplary embodiment of the invention is illustrated in the drawing, in which.

DETAILED DESCRIPTION OF THE DRAWINGS

A pivot 2 is mounted tiltably and rotatably in a housing 1 of a pivot joint via a ball head (which cannot be seen).

A bellows 3 made of elastic material effects sealing between the housing 1 and the movable pivot 2. This bellows 3 is fixedly and leaktightly connected at its first end to the housing 1. At its second end, the bellows 3 surrounds the pivot 2 in a radially leaktight manner. Sealing is, in this case, such that rotational and sliding movements between the pivot and the bellows 3 are possible.

Figure 1:
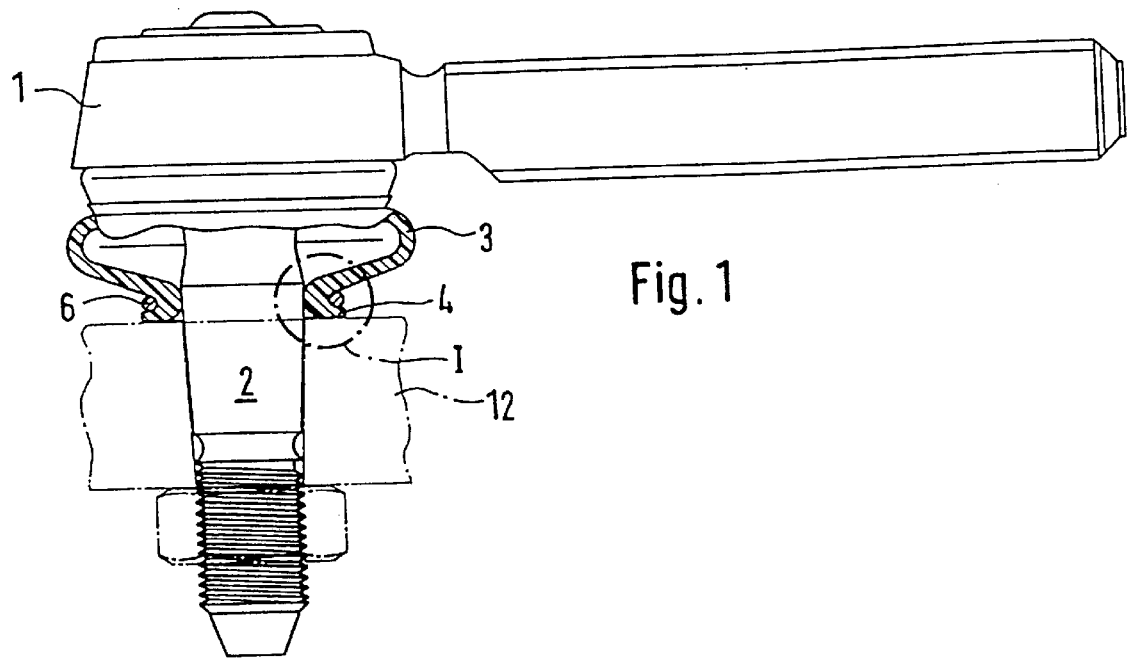
FIG. 1 shows a view of a pivot joint with a screwed-on counterpiece, with a part region of the bellows being depicted in cutaway form.
Figure 2:
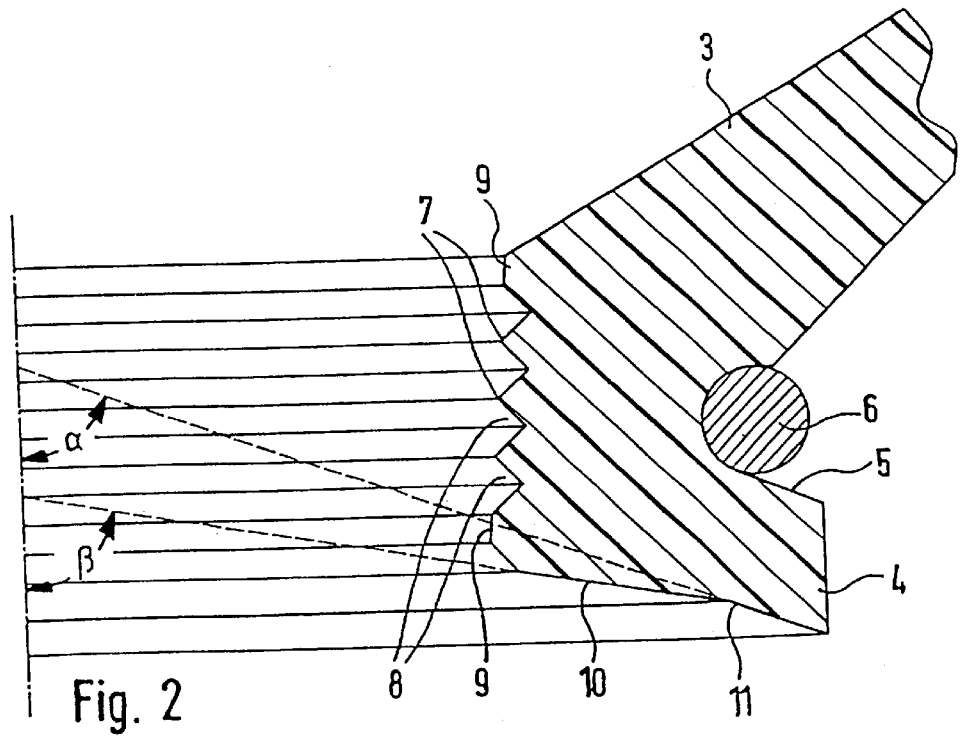
FIG. 2 shows a detail according to II in FIG. 1 of the sealing region at the second bellows end.

An annular flange 4 terminating freely on its end face is integrally formed on the second end of the bellows 3. The end bears against the pivot. The integral forming of the annular flange 4 is such that there is an annular contraction 5 in the transitional region to the remaining bellows body. This annular contraction 5 receives a closed inelastic ring 6, by which the bellows material is tensioned against the pivot 2 in a radially leaktight manner in the region of the annular flange 4. The illustration according to FIG. 2 of the detail of the sealing portions at the free end of the bellows 3, said end not being connected fixedly to the housing 1, shows the design measures by which the combination according to the invention of radial and axial sealing is achieved.

The respective radial sealing portion is a cylindrical portion with a cylindrical sealing face having a labyrinth-like effect. Integrally formed in this cylindrical sealing face are grooves which form annular elevations 7 and depressions 8 directly lined up axially with one another. In each axial end region of the cylindrical face, the last elevation is provided as a kind of annular collar 9 with a cylindrical sealing face. The elevations located between the two outer annular collars 9 have linear sealing edges in each case radially on the inside.

As regards the wall face which is formed by the radial inner faces of the annular collars 9 and the remaining elevations 7, it should also be noted, for the sake of completeness, that this is of slightly conical design, with an inside diameter increasing toward the bellows interior. There is a corresponding conically receiving face on the pivot 2, onto which the free end of the bellows 3 is drawn leaktightly.

The end face of the annular flange 4 at the free end of the bellows 3 is formed from an inner and an outer annular face 10 and 11 running conically. The angle of inclination of the outer annular face 11 relative to the pivot axis is $\alpha=70°$ and the corresponding angle of the inner annular face 10 measures $\beta=80°$.

For good sealing of the annular collar 9 adjacent to the inner annular face 10, it is important that the inner annular face 10 does not merge directly into the annular collar 9, but via a depression 8.

The intersection point of the conical faces of the inner and outer annular faces 10 and 11 is located on a radius which is 12% smaller than the outer radius of the annular flange 4. The height of the annular flange 4 in relation to its outside diameter is 8%. That flank of the annular flange 4 which faces the ring 6 runs parallel to the conical face of the outer annular face 11.

When the pivot 2 is in the state in which it is fitted to a counterpiece 12, the end face having the annular faces 10 and 11 bears, in a common plane, flat against the counterpiece, thus resulting in axial sealing in addition to the radial sealing of the annular flange 4. The counterpiece 12 must have a planar bearing face. If the counterpiece 12 consists of metal, its surface must have a roughness of $R_z \leq 40$ in order to achieve sufficient axial sealing. If the metallic counterpiece 12 is a forging, its sealing surface must have a quality which is defined by c=25/tpi 80.

The axial height of the contraction 5 is slightly smaller than the diameter of the ring 6 lying in the latter. As a result, the ring 6 generates, in addition to a radial tension force, an axial tension force which presses the annular flange 4, via its end face, firmly and sealingly against the counterpiece 12.

For the radially outer region of the annular flange 4 to come to bear firmly and leaktightly in the axial direction, it is important that the ring 6 engages axially in a region of the annular flange 4 which is as far outward radially as possible. This means, in other words, that the annular flange 4 projects as little as possible radially beyond the outside diameter of the ring 6. Furthermore, it is also important, for optimum sealing, that the annular flange 4 possesses, in its region corresponding to the outer annular face 11, flanks which run approximately parallel to one another in the radial direction.

What is claimed is:

1. A pivot joint for automobiles having a bellows surrounding the pivot joint to form a bellows seal, comprising:

a pivot housing;

a first end of the bellows connected fixedly and leaktightly to the pivot housing;

a pivot;

a second end of the bellows annularly surrounding the pivot leaktightly, wherein relative movements are possible between the second bellows end and the pivot;

wherein in the second bellows end, having a sealing effect, a radially outer annular contraction forms an annular flange terminating freely on an end face;

a ring assisting a radial sealing of the second bellows end lies in the contraction;

the second bellows end bears radially against the pivot via an approximately cylindrical sealing face which is provided with annular axially alternating elevations and depressions having a labyrinth-like effect;

the elevations of the approximately cylindrical sealing face of the second bellows end in each case terminating axially in a last elevation which is designed as an annular collar with a cylindrical inner face;

wherein the pivot joint, defined by features present in the bellows seal in an uninstalled state further has:

(a) the end face of the annular flange divided into an inner and an outer concave annular face, of which the outer annular face is designed with greater concavity than the inner annular face;

(b) angles of inclination of the inner and outer concave annular faces relative to a bellows axis approximately $\alpha=70°$ for the outer annular face and approximately $\beta=80°$ for the inner annular face;

(c) a radial extent of the outer annular face approximates 12% in relation to a radius of the outer annular face of the annular flange of the second bellows end;

(d) an annular depression located between the annular collar, adjacent to the inner annular face, on an inner sealing surface of the second bellows end and the inner annular face;

(e) flanks of the annular flange of the second bellows end running approximately parallel to one another;

(f) a height of the annular flange in a region of the outer annular face measuring uniformly approximately 8% of an outer diameter of the annular flange;

(g) the ring designed to be closed and made of inelastic material and projecting radially outward into an annular region formed by an outer sealing face, in which the ring bears axially against the annular flange; and (h) an axial height of a portion of the contraction is smaller than the amount by which the ring would bear positively in the portion, without the latter being widened, so that, with the ring inserted, this portion is widened as a result of the elastic deformation of a material of the bellows forming this contraction.

2. The bellows seal as claimed in claim 1, wherein the annular flange bears against a planar sealing counterface made of metal, with a machined surface having a roughness $R_z \leq 40$ or a forged surface with a structure of c=25/tpi 80.

3. The bellows seal as claimed in claim 1, wherein the bellows seal is made of polychloroprene provided with slip additives.

4. The bellows seal as claimed in claim 2, wherein the bellows seal is made of polychloroprene provided with slip additives.

* * * * *